Feb. 12, 1963     R. J. KOUTNIK     3,077,207
VACUUM PULSATOR
Filed July 14, 1960
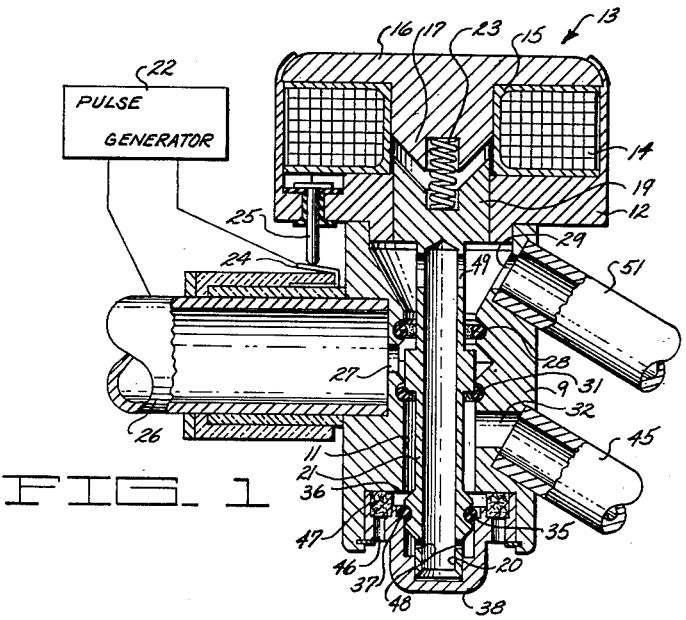
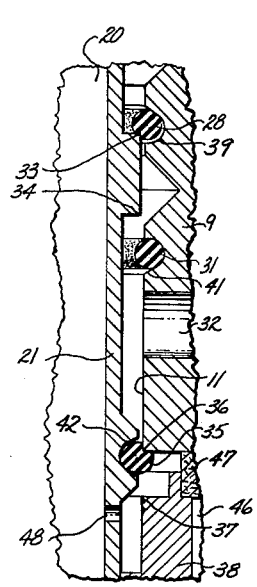
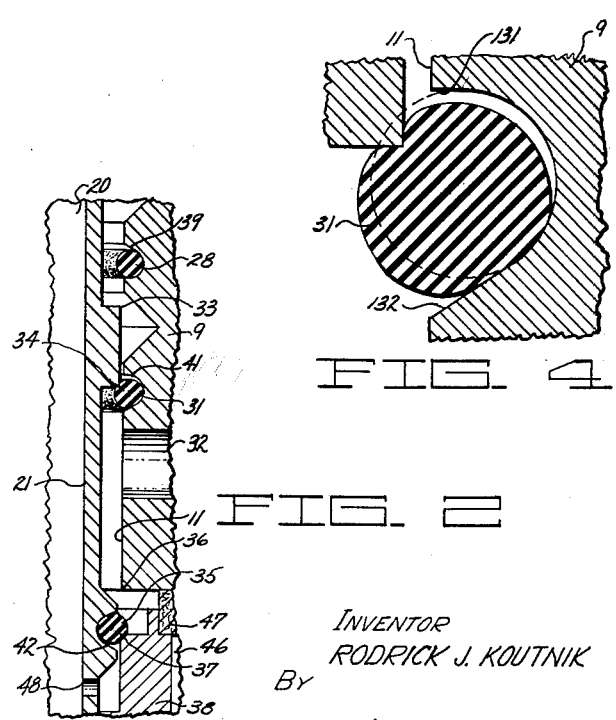
INVENTOR
RODRICK J. KOUTNIK
By
ATTORNEY

United States Patent Office 3,077,207
Patented Feb. 12, 1963

3,077,207
VACUUM PULSATOR
Rodrick J. Koutnik, Vista, Calif., assignor to Clary Corporation, San Gabriel, Calif., a corporation of California
Filed July 14, 1960, Ser. No. 42,792
4 Claims. (Cl. 137—622)

This invention relates to poppet valves of the three or four way type in which O-rings are used as valve seating elements.

Valves of the above type have heretofore been provided, using O-rings as valve seats wherein an annular shoulder engages a resilient O-ring of rubber or plastic to open or close a fluid passage. The O-rings are retained in annular grooves to prevent the same from being swept downstream by the fluid as the annular shoulder and O-ring are separated.

Although such valves, employing two or more O-ring valve seats, have heretofore performed satisfactorily, the length of stroke of the poppet and the spacing between the O-ring grooves and the annular seating shoulders have previously had to be made with very close tolerances in order to effect proper sealing of the O-rings and yet not cause too great an indentation of the shoulders against the O-rings which would otherwise cause damage to the O-rings.

Such requirements for accurate dimensioning of the parts, especially where relatively wide temperature variations and corresponding dimensional changes due to such variations are encountered, materially increase the cost of production of such valves and in most cases require adjustment features to properly position the parts.

It therefore becomes a principal object of the present invention to provide a valve of the above type in which relatively wide variations in the length of the poppet stroke and spacing between the O-rings and their cooperating sealing shoulders can be tolerated.

Another object is to provide a valve of the above type which is inexpensive to manufacture and assemble and which will tolerate considerable variations in dimensions due to temperature variations, stress, aging or the like.

The manner in which the above and other objects of the invention are accomplished will be readily understood on reference to the following specification when read in conjunction with the accompanying drawing, wherein:

FIG. 1 is a longitudinal sectional view through a two way electromagnetic valve embodying a preferred form of the invention.

FIG. 2 is a fragmentary sectional view showing the relationship between the seating O-rings and their respective annular seating shoulders.

FIG. 3 is a fragmentary sectional view similar to FIG. 2 but ilustrating the poppet in its alternate position.

FIG. 4 is an enlarged sectional view illustrating the shape of one of the O-ring grooves.

Referring to the drawing, a valve body 9 having a longitudinal bore 11 therein is adequately attached through means not shown to a base 12 of an electromagnetic actuator generally indicated at 13.

The base 12 of low carbon steel or other magnetic material supports a coil 14, a coil bobbin 15 of electrically insulating material and a cap 16, said cap 16 having an inwardly extending boss 17 and being also formed of steel or the like.

An armature 19 is formed on the upper portion of a poppet 21 which is movable endwise in the bore 11 adjacent the boss 17, said poppet 21 having an axial bore 20 for communicating opposite ends of said valve body bore 11. The poppet is likewise formed of steel.

Upon application of a pulse from a pulse generator 22, current will pass through a conducting spring like clip 24, a projecting contact 25, coil 14, base 12, body 9, and a vacuum pipe 26 back to the pulse generator, to energize the coil 14. The latter will create a magnetic flux path passing through the base 12, cap 16, boss 17, and the armature 19 to attract the armature 19 upward against the action of a compression spring 23 positioned between the boss 17 and the armature 19.

The vacuum pipe 26, which communicates with a vacuum or minus pressure source is connected to the valve bore 11 through a vacuum port 27. A first O-ring 28 is located intermediate said vacuum port and a first service port 29, and a second O-ring 31 is located between said vacuum port and a second service port 32.

The poppet 21 has annular shoulders 33 and 34 (FIGS. 2 and 3) for engaging with a respective one of said O-rings 28 or 31 for connecting a selective one of said service ports with said vacuum port.

The poppet 21 also carries an O-ring 35 which engages with respective annular shoulders 36 and 37, said shoulder 36 being formed in the valve body 9, and annular shoulder 37 being formed by an end cap 38 to later be described.

The O-rings 28 and 31 are positioned in respective grooves 39 and 41 formed in the body 9. The O-ring 35 is positioned in a groove 42 formed in the valve poppet 21.

The shape of the groove 41 for the O-ring 31 is shown in detail in FIG. 4. It will be noted that shoulder 131 of the groove nearest the vacuum port extends in a plane substantially at a right angle to the center line of the bore 11, and the shoulder 132 nearest the service port 32 extends in a conical plane converging toward the bore 11 and away from O-ring 31, the angle of convergence being approximately 60° to the axis of the bore. The remaining portion of the O-ring groove approximates in cross sectional curvature the cross sectional curvature of the O-ring.

The shape of the groove 39 for the O-ring 28 is identical to the shape of O-ring groove 41 except that it is reversed.

The shape of the groove 42 for the O-ring 35 is such that both of the opposite shoulders thereof extend in conical planes toward said bore and away from the O-ring 35. Here also, such shoulders each extend at approximately 60° to the axis of the bore.

Application of a pulse from the pulse generator to the valve in its illustrated position (FIG. 1) will energize the coil 41 to thereby attract the armature 19, and therefore the poppet 21, upwardly into the position illustrated in FIG. 3, whereby the seat 33 will contact the O-ring 28 while at the same time the O-ring 35 will contact the shoulder 36. This will allow vacuum to be applied from line 26 to a service line 45 which may be connected, for example, to a teat cup (not shown) of a milking machine.

Should, through machining or assembly tolerances, or temperature variations, one of the seats 33 and 36 engage its O-ring prior to engagement of the second seat, the poppet will continue to move upwardly and the first engaging seat will slightly roll or move its respective O-ring up the conical shoulder until the second seat engages its respective O-ring sufficiently to effect a seal. The spacing between the armature 19 and boss 17 is preferably such that with normal energization of coil 14 poppet will move upwardly until the armature strikes the boss thereby bodily moving one or both O-rings 28 and 35 from seating positions in their grooves. On the other hand, the spring 23 is so constructed that it will move the poppet downwardly until both O-rings 31 and 35 have engaged their respective seats sufficiently to effect a proper seat.

Such additional movement of the O-ring is exemplified in the illustration in FIG. 4 wherein the O-ring shown therein has been bodily moved out of the main portion of its socket to enable adequate seating of the O-ring 35 against its seating shoulder 37.

Raising of the poppet to cause O-ring 35 to engage shoulder 36 will allow air under atmospheric pressure to pass through a plurality of holes 46 in the end cap 38 and filtering element 47, whereby O-ring 35, engaging the shoulder 36, will allow the air to pass between the poppet 21 and the seat 37, through a plurality of holes 48 in the poppet member, and into the bore 20. The upper portion of the poppet 21 has a pluraltiy of holes 49 which allow the air to pass through the first service port 29 to thereby relieve the sevrice port 29, service line 51 and its associated teat cup of vacuum or minus pressure while the second service port and associated connections will be under vacuum.

As the pulse from the pulse generator dies out, the coil 14 will deenergize allowing the spring 23 to urge the armature and the poppet downwardly until both of the shoulders 34 and 37 have engaged their respective O-rings as shown in FIG. 2, at which time air under atmospheric pressure will pass through the holes 46, filter 47 and between the shoulder 36 and O-ring 35 to enter into the second service line 45.

Although the invention has been described herein in detail and certain specific terms and languages have been used, it is to be understood that the present disclosure is illustrative rather than restrictive and that changes and modifications may be made without departing from the spirit or scope of the invention as set forth in the appended claims.

Having thus described the invention what is desired to secure by United States Letters Patent is:

1. A valve comprising a valve body having an axial bore, two axially spaced service passages connected to said bore, and a vacuum passage connected to said bore intermediate said service passages; O-ring grooves in said bore intermediate said vacuum passage and each of said service passages, the groove shoulder of each of said O-ring grooves nearest said vacuum passage and adjacent said bore extending in a plane at least substantially at right angles to the axis of said bore, the groove shoulder of each of said O-ring grooves nearest the respective one of said service passages extending in at least substantially a conical plane whose apex is located coincident with the axis of said bore and away from said vacuum passage, O-rings in said grooves, and a valve element movable axially in said bore, said valve element having annular shoulders extending intermediate said O-rings, said annular shoulders being effective to embed in respective ones of said O-rings upon movement of said valve member in opposite directions, and said annular shoulders being effective to move respective ones of said O-rings axially along the respective groove shoulders nearest the respective ones of said service passages.

2. A valve comprising a valve body having an axial bore, two axially spaced service passages connected to said bore, and a vacuum passage connected to said bore intermediate said service passages; O-ring grooves in said bore intermediate said vacuum passage and each of said service passages, O-rings in said grooves, the groove shoulder of each of said O-ring grooves downstream from its respective O-ring extending in a plane at right-angles to the axis of said bore, the groove shoulder of each of said O-ring grooves upstream from its respective O-ring extending in a conical plane whose apex is located coincident with the axis of said bore and away from its respective O-ring, and a valve member movable axially in said bore, said valve element having a pair of annular shoulders thereon effective to embed in respective ones of said O-rings, said annular shoulders each being on the downstream side of its respective O-ring, one of said annular shoulders being engageable with its respective O-ring upon movement of said valve member in one direction and the other of said annular shoulders being engageable with its respective O-ring upon movement of said valve member in the opposite direction, each of said annular shoulders being effective to move its respective O-ring axially along the respective upstream groove shoulder.

3. A valve comprising a valve body having an axial bore, two axially spaced service passages connected to said bore, and a vacuum passage connected to said bore intermediate said service passages; first and second O-ring grooves in said bore intermediate said vacuum passage and said service passages, the groove shoulder of each of said O-ring grooves nearest said vacuum passage and adjacent said bore extending in a plane at least substantially at right-angles to the axis of said bore, the groove shoulder of each of said O-ring grooves nearest the respective one of said service passages being inclined in at least a substantially conical plane whose apex is located coincident with the axis of said bore and away from said vacuum passage, first and second O-rings in respective ones of said grooves, axially spaced first and second annular shoulders in said bore, a vent passage connected to said bore intermediate said annular shoulders, a valve element movable axially in said bore, said valve element having third and fourth annular shoulders intermediate said O-rings, said third annular shoulder being effective to embed in said first O-ring upon axial movement of said valve element to one position, said fourth annular shoulder being effective to embed in said second O-ring upon axial movement of said valve element to said second position, a third O-ring groove in said valve element intermediate said first and second shoulders, each of the end groove shoulders of said third groove being inclined in at least a substantially conical plane whose apex is located coincident with the axis of said bore, a third O-ring in said third groove, said first annular shoulder being effective to embed in said third O-ring upon movement of said valve element to said first position and said second annular shoulder being effective to embed in said third O-ring upon movement of said valve element to said second position, said first and third annular shoulders being effective to move said third and first O-rings respectively axially along respective ones of said inclined groove shoulders upon movement of said valve element to said one position and said second and fourth annular shoulders being effective to move said third and second O-rings respectively, axially along respective ones of said inclined groove shoulders upon movement of said valve element to said second position.

4. A valve comprising a valve body having an axial bore closed at opposite ends thereof, two axially spaced service passages connected to said bore, and a vacuum passage connected to said bore intermediate said service passages; first and second O-ring grooves in said bore intermediate said vacuum passage and said service passages, the groove shoulder of each of said O-ring grooves nearest said vacuum passage and adjacent said bore extending in a plane at least substantially at right-angles to the axis of said bore, the groove shoulder of each of said O-ring grooves nearest the respective one of said service passages being inclined in at least a substantially conical plane whose apex is located coincident with the axis of said bore and away from said vacuum passage, first and second O-rings in respective ones of said grooves, axially spaced first and second annular shoulders in said bore, a vent passage connected to said bore intermediate said annular shoulders, a valve element movable axially in said bore, said valve element having third and fourth annular shoulders intermediate said O-rings, said third annular shoulder being effective to embed in said first O-ring upon axial movement of said valve element to one position, said fourth annular shoulder being effective to embed in said second O-ring upon axial movement of said valve element to said second position, a third O-ring groove in said valve element intermediate said first and second shoulders, each of the end groove shoulders of said third groove being inclined in at least a substantially conical plane whose apex is located coincident with the axis of said bore, a third O-ring in said third groove, said first annular shoulder being effective to embed in said third O-ring upon movement of said valve element to said first position and said second annular shoulder being effective to embed in said third O-ring upon movement of said valve element to said second position, said first and third annular shoulders being effective to move said third and first O-rings respectively axially along respective ones of said inclined groove shoulders upon movement of said valve element to said one position and said second and fourth annular shoulders being effective to move said third and second O-rings respectively axially along respective ones of said inclined groove shoulders upon movement of said valve element to said second position, and an axial passage in said valve element communicating opposite ends of said bore together.

References Cited in the file of this patent

UNITED STATES PATENTS

| | | |
|---|---|---|
| 2,524,142 | Seeloff | Oct. 3, 1950 |
| 2,624,542 | Ghormley | Jan. 6, 1953 |
| 2,658,523 | Johnson | Nov. 10, 1953 |
| 2,660,834 | MacGlashan | Dec. 1, 1953 |
| 2,661,762 | Bryant | Dec. 8, 1953 |
| 2,702,049 | Seeloff | Feb. 15, 1955 |
| 2,971,090 | Piet et al. | Feb. 7, 1961 |